M. LUECHT & F. NEUNSINGER.
VEHICLE WHEEL.

No. 179,803. Patented July 11, 1876.

Witnesses.
Otto Hufeland
Rob't E. Miller

Inventors.
Moritz Luecht
Frederick Neunsinger
by
Van Santvoord & Hauff
Attorneys

UNITED STATES PATENT OFFICE.

MORITZ LUECHT AND FREDERICK NEUNSINGER, OF HOBOKEN, N. J.

IMPROVEMENT IN VEHICLE-WHEELS.

Specification forming part of Letters Patent No. 179,803, dated July 11, 1876; application filed June 15, 1876.

*To all whom it may concern:*

Be it known that we, MORITZ LUECHT and FREDERICK NEUNSINGER, both of Hoboken, in the county of Hudson and State of New Jersey, have invented a new and useful Improvement in Wheels for Vehicles, which improvement is fully set forth in the following specification, reference being had to the accompanying drawing, in which—

Figure 1:
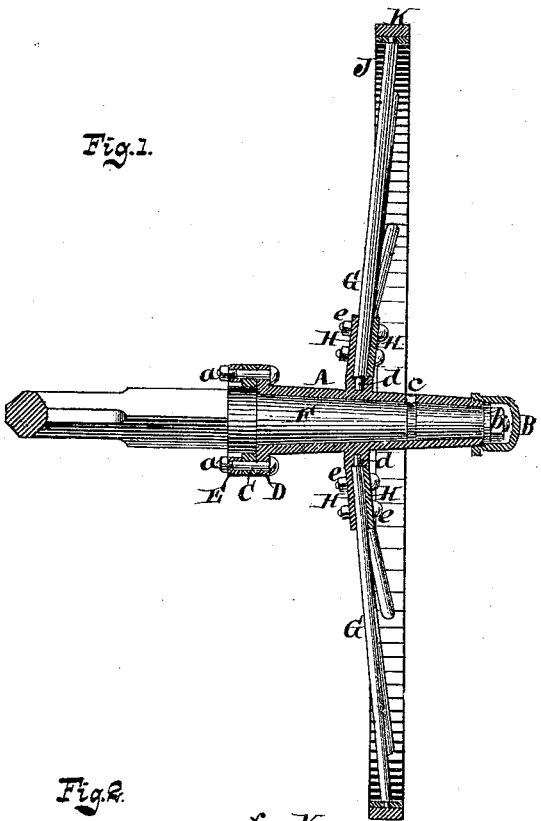
Figure 2:
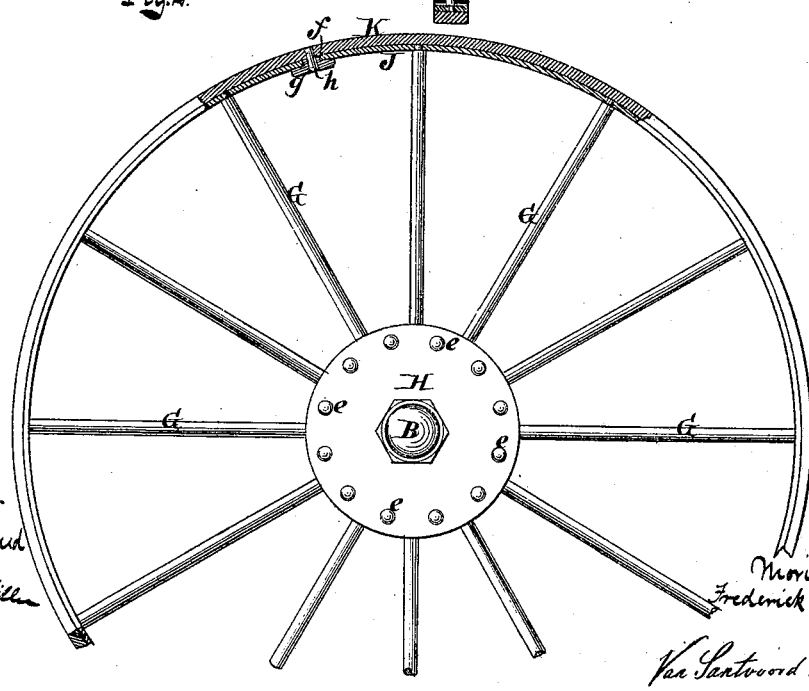

Figure 1 represents a cross-section of a wheel containing my improvement. Fig. 2 is a side elevation thereof, partly in section.

Similar letters indicate corresponding parts.

Our improvement relates to the construction of wheels for vehicles; and consists in providing the hub with a series of holes or sockets on its circumference to receive the inner ends of the spokes, and in combining therewith two flat rings, which are arranged contiguous to the circumference of the hub and on opposite sides of the spokes, while they are connected together by means of screws or rivets, whereby the spokes are very firmly held in place, as hereinafter explained at length.

In the drawing, the letter A designates the hub of a wheel, and B is a detachable cap arranged on the outer end of such hub. This cap B is preferably fastened by means of a screw-thread; but, if desired, a bayonet-joint or any other suitable means may be used. The letter C designates a packing-ring, of india-rubber or other suitable material, which is arranged on the inner end of the hub A. The said inner end of the hub A is provided with a flange, D, and the packing C is fastened to this flange by screws $a$, a metallic ring, E, being placed without the packing-ring, as shown.

When the hub A is placed on the axle F of a vehicle the axle is secured in the usual way by means of a nut, $b$, screwed on the outer end thereof, and the cap B is fastened to the outer end of the hub over the nut.

We prefer to make a hole, $c$, in the hub A, for the admission of lubricating material to the axle F; and the latter may be provided with a longitudinal groove to distribute the said material.

The packing-ring C is so made as to bind itself firmly on the axle F, and by the said ring the lubricating material is very effectually prevented from escaping at the inner end of the wheel-hub, while it is prevented from escaping at the outer end thereof by the cap B.

On the circumference of the hub A are formed a series of holes or sockets, $d$, and the inner ends of the spokes G of the wheel are fitted in these holes or sockets, as shown. Against the spokes G, and on the opposite sides thereof, are placed two rings, H H, which have a flat form, and one of which is preferably cast with the hub A, while the other is snugly fitted to the circumference of the hub. These rings H H are connected together by means of screws or rivets $e$, passing transversely through them and between the spokes G.

When the outer ends of the spokes G are secured in the felly of the wheel, and the inner ends thereof are inserted in the holes or sockets $d$ in the hub, while the rings H H are fastened together in the proper position, a wheel of great strength is obtained, the spokes G being held against a lateral movement by the rings H H, and lengthwise by the hub and felly.

The letter J designates the felly of a wheel, and K is the tire. The said felly J is provided with a cleft or opening, $f$, at any suitable point, and this cleft contains a flanged fillet, $g$, the flanges of which lie against the under or inner surface of the felly. The fillet $g$ is secured to the tire K by a rivet, $h$, or by means of a screw.

In the construction of our wheel we fasten the outer ends of the spokes G to the felly J, and then shrink the tire K thereon in the usual way. The fillet $g$ is then fastened in the cleft $f$.

In case the tire K shrinks or expands under the influence of changes of temperature, the felly J accommodates itself thereto by reason of the cleft, and the tire K is not liable to work loose.

What we claim as new, and desire to secure by Letter Patent, is—

A wheel-hub, A, which is provided with holes or sockets $d$ on its circumference for the reception of the inner ends of the spokes F, in combination with rings H H, to prevent lateral movement of the spokes, substantially as described.

In testimony that we claim the foregoing we have hereunto set our hands and seals this 1st day of June, 1876.

MORITZ LUECHT. [L. S.]
FREDERICK NEUNSINGER. [L. S.]

Witnesses:
W. HAUFF,
E. F. KASTENHUBER.